Figure 4:
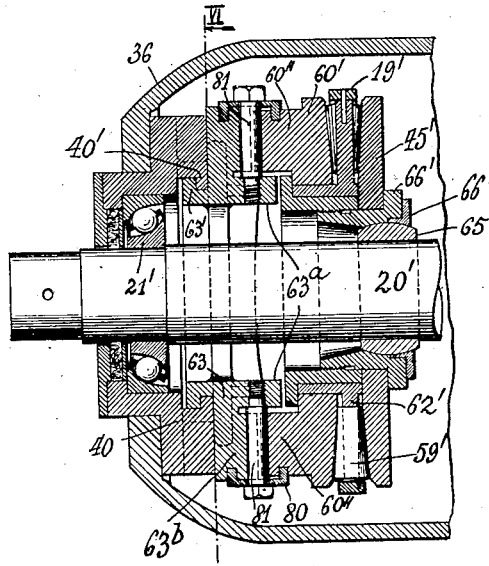

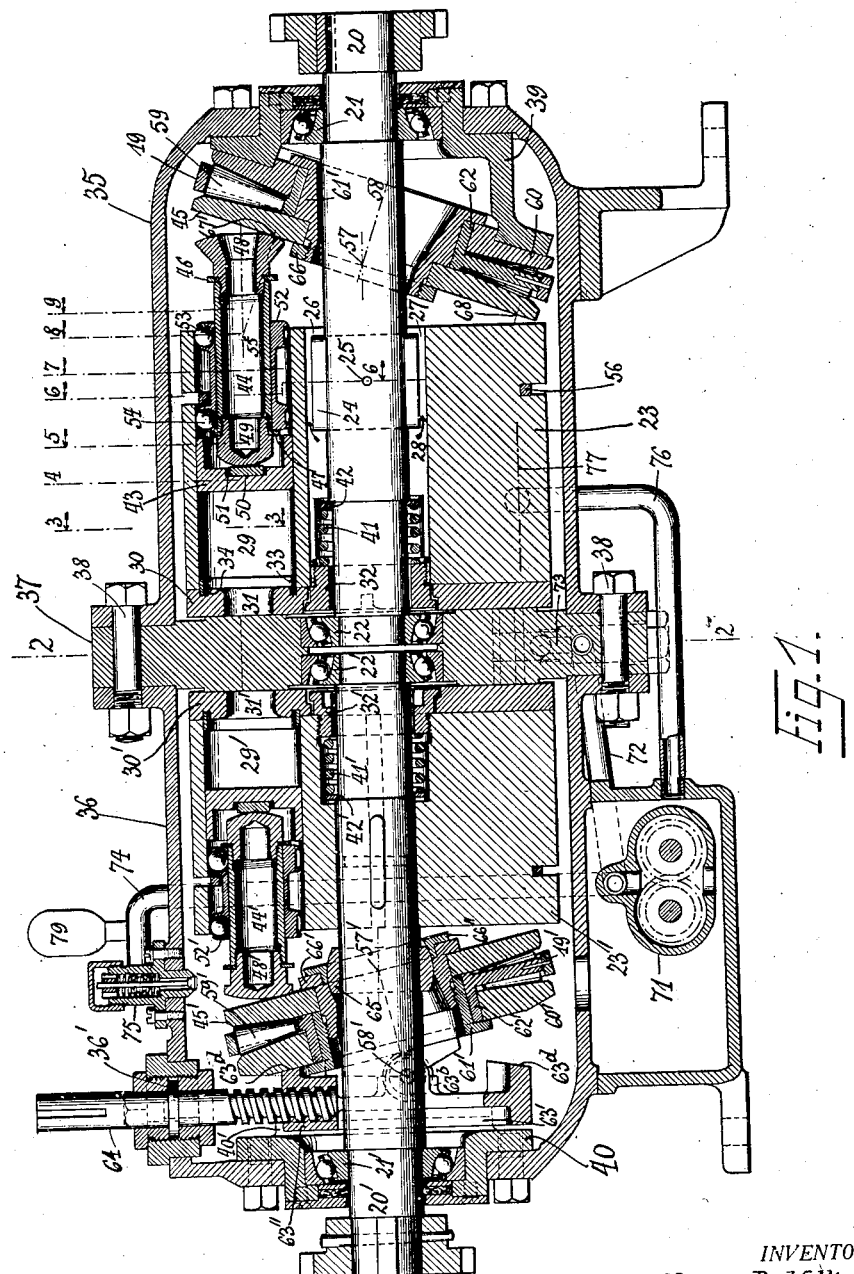

May 26, 1925.
H. D. WILLIAMS
VARIABLE SPEED GEAR
Filed July 27, 1920
1,539,616
3 Sheets-Sheet 2
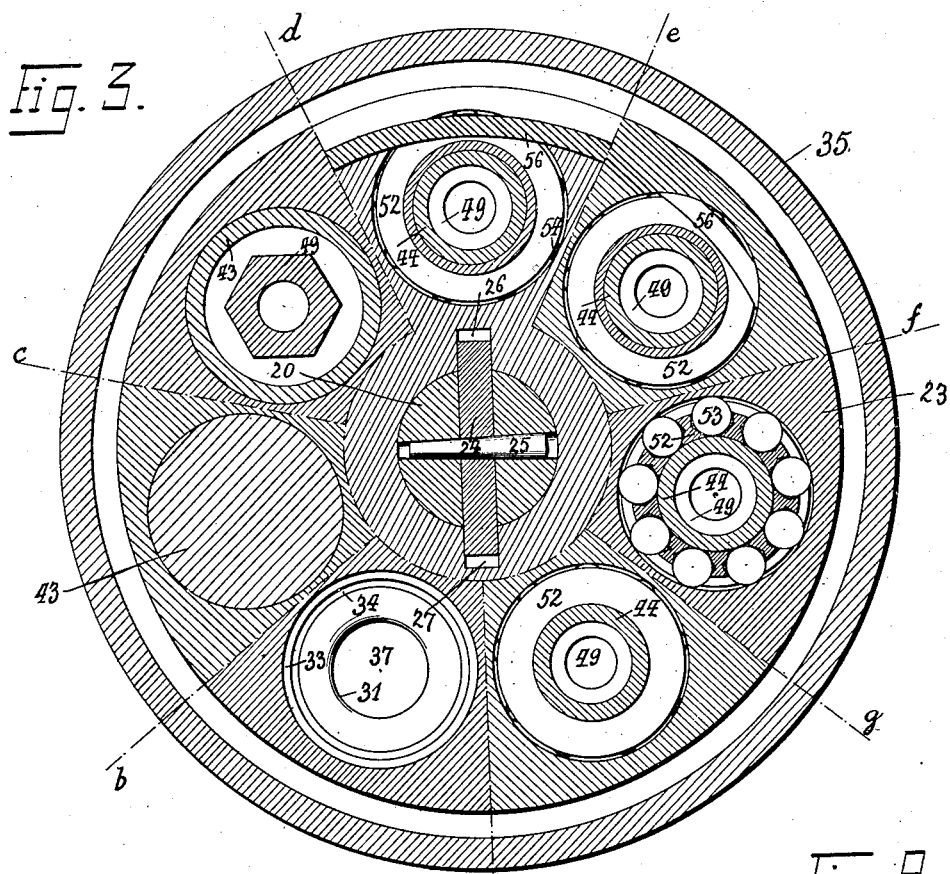
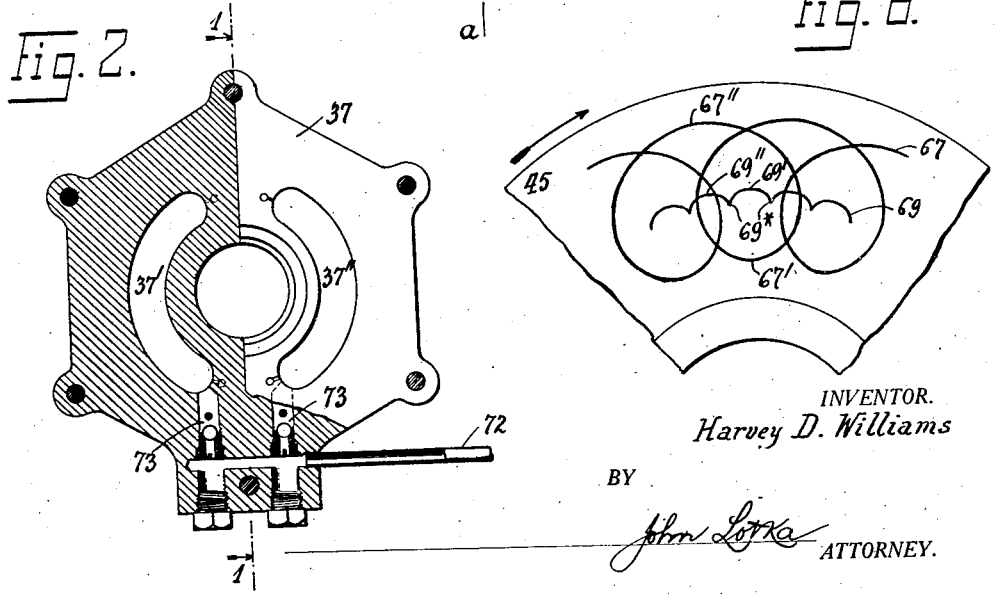
INVENTOR.
Harvey D. Williams
BY
John Lotka ATTORNEY.

May 26, 1925.

H. D. WILLIAMS

VARIABLE SPEED GEAR

Filed July 27, 1920

1,539,616

3 Sheets-Sheet 3

INVENTOR.
Harvey D. Williams
BY
John Lotka
ATTORNEY.

Patented May 26, 1925.

1,539,616

UNITED STATES PATENT OFFICE.

HARVEY D. WILLIAMS, OF WALLINGFORD, CONNECTICUT, ASSIGNOR TO THE WATERBURY TOOL COMPANY, OF WATERBURY, CONNECTICUT, A CORPORATION OF CONNECTICUT.

VARIABLE-SPEED GEAR.

Application filed July 27, 1920. Serial No. 399,364.

*To all whom it may concern:*

Be it known that I, HARVEY D. WILLIAMS, a citizen of the United States, and resident of Wallingford, in the county of New Haven and State of Connecticut, have invented certain new and useful Improvements in Variable-Speed Gears, of which the following is a specification.

My invention relates to apparatus intended for operation with a fluid in motion, and has been designed chiefly for use in connection with variable speed gears of the hydraulic type, comprising a pump which causes liquid to be propelled and to actuate a motor, and the present invention is more particularly a development of speed gears of the general character set forth in Letters Patent of the United States Nos. 893,558, 925,148 and 1,044,838 granted to me on July 14, 1908, June 15, 1909, and November 19, 1912 respectively.

The object of my invention is to improve variable speed gears of the above-indicated type, particularly in the following respects: First, with a view of decreasing the resistance within the apparatus, and enabling higher speeds to be used readily, I provide improved lubricating means which enable me to dispense with immersing some of the parts in an oil bath, as in my earlier patents. It is highly desirable to be able to use high speeds for the pump, since certain engines such as internal combustion engines, which are frequently employed for driving the pump of the speed gear, are operated most economically at a high rate of speed, and the same characteristic of high rotary speed is present in electric motors. Therefore, especially when the pump is to be driven by an electric motor or by an internal combustion engine, my improvements are very valuable in that they enable the pump to be operated at the same number of revolutions as the prime motor and thus dispense with the necessity existing hitherto in such cases, of either interposing a reduction gear between the prime motor and the pump, or of employing a prime motor of especially low speed and therefore of a heavy and bulky type. Second, in variable speed gears of this type as constructed hitherto, a universal joint has been employed in most cases in connection with the drive shaft actuating the pump and with the driven shaft operated by the liquid-driven motor. Such universal joint has proved the cause of a considerable loss in efficiency, and moreover, on account of its kinematic errors, requires special and expensive constructions and complex dimensioning of the various parts in order to obtain compensation for such errors. Moreover, such universal joint produces a comparatively large amount of friction and consequently heat, and as the amount of power which a particular machine can transmit is limited by the temperature, it will be evident that any improvement whereby the heat developed in the machine is reduced, will correspondingly enhance the capacity of the machine or variable speed gear. Other features of my invention will appear from the detailed description following hereinafter, and the novelty will be particularly pointed out in the appended claims.

Figure 5:
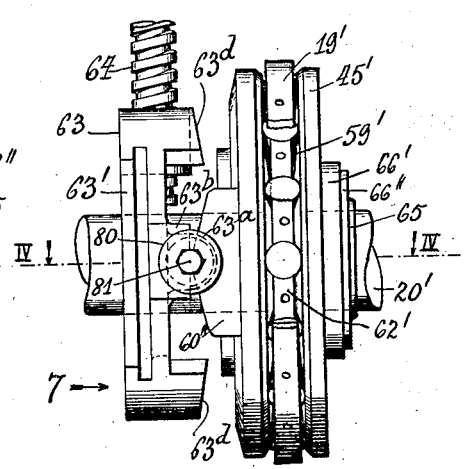
Figure 6:
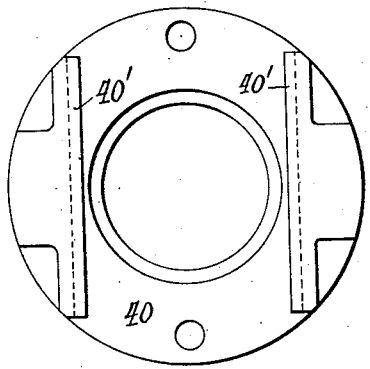
Figure 7:
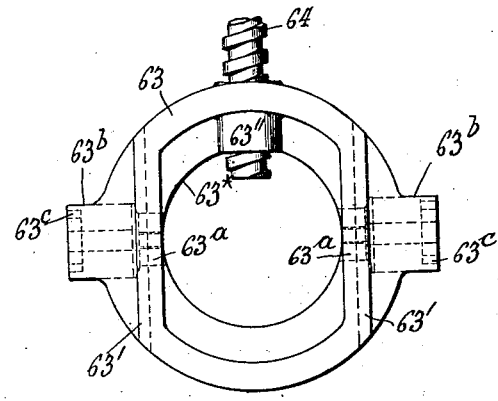

Reference is to be had to the accompanying drawings, in which Fig. 1 is a longitudinal vertical section of a preferred embodiment of my invention, taken on line 1—1 of Fig. 2, the latter being chiefly a cross section on line 2—2 of Fig. 1, but showing a portion of the midplate in face view, said Fig. 2 being on a smaller scale than Fig. 1; Fig. 3 is a composite cross section of the machine, at the liquid-motor portion, the sector between the lines $a$ and $b$ of Fig. 3 being in section on the line 3—3 of Fig. 1, the sector between the lines $b$ and $c$ being in section on the line 4 of Fig. 1, the sector between the lines $c$ and $d$ being in section on the line 5 of Fig. 1, the sector between the lines $d$ and $e$, together with the central portion of Fig. 3, being in section on the line 6—6 of Fig. 1, while the next three sectors are in section on the lines 7 (between lines $e$ and $f$), 8 (between the lines $f$ and $g$), and 9 (between the lines $g$ and $a$) respectively of Fig. 1; Fig. 4 is a partial horizontal section substantially on the line IV—IV of Fig. 5; Fig. 5 is a side elevation of certain adjustable parts of the pump, showing said parts in a position different from the one in Fig. 1; and Figs. 6 and 7 are face views of certain parts shown in Fig. 4, looking outwardly and inwardly respectively, while Fig. 8 is a partial diagram illustrating a portion of the swashplate at the motor end of the apparatus, looking in a direction perpendicular to the plane of rotation of said plate, and showing the paths described on said plate, by the axis of a piston rod and by the point of contact of said piston rod or push rod with the swash-plate respectively.

In the embodiment of my invention shown herein, the apparatus comprises a pump and a liquid-motor driven thereby, both arranged in the same casing to rotate about aligning axes, but I desire it to be understood that my invention is not limited to such specific arrangement. The two sections of the machine are of the same general character, but control mechanism for varying the position (inclination) of the swash-plate has been indicated only at the pump section, while at the motor section a constant inclination of its swash-plate has been assumed; again, I do not limit myself to this specific construction.

I will first describe those parts of the two sections which are alike or substantially so, the numerals with indices designating parts of the pump which correspond to the motor parts bearing like numerals, without indices. For the sake of brevity, only the motor parts will be described in detail.

The motor shaft 20 is supported by ball bearings 21, 22. Mounted on this shaft and keyed thereto in a manner that permits a slight degree of longitudinal freedom is the cylinder barrel 23. The key 24 extending diametrically through the shaft is held therein by the taper pin 25 and engages the cylinder barrel by the two diametrically opposite key ways 26 and 27, these being cut deeper than is required by the height of the key, in order to form a passageway 28 for the escape of lubricating oil as indicated by the arrow at 28. The cylinder barrel is bored from end to end by an odd number (seven in the particular case illustrated) of symmetrically and equally spaced holes or cylinders 29 of uniform diameter. At one end, the holes 29 are partly closed by a plate 30, provided with perforations 31, each of them in axial alignment with one of said holes or cylinders 29, these perforations being the only openings to the cylinders 29 at this end. As regards the longitudinal or axial location of the plate 30 with respect to the cylinder barrel 23, these two parts are only loosely clamped together by a threaded sleeve 32. In other respects, the plate 30 is accurately articulated or fitted to the cylinder barrel by means of brass rings 33. These are short lengths of brass tubing secured rigidly in annular grooves in the plate 30 by calking the copper rings 34. The brass rings 33, originally fitted loose in the cylinders 29, are subsequently expanded to close fits therein; thus, while the plate 30 has a slight freedom of movement toward and from the cylinder barrel 23 and more or less at different parts of the circumference, yet there will be maintained a fluid-tightness by virtue of the rings 33 being in contact with the inner surfaces of the cylinders 29.

The stationary parts of the machine comprise a casing made of two shells 35 and 36 surrounding the motor and the pump respectively, and a mid-plate 37, fastened rigidly together by bolts 38; closing plates 39, 40 are located at the ends of the motor section and of the pump section respectively, said plates supporting the ball-bearings 21, 21' at the outer ends of the shafts 20, 20' respectively, while the mid-plate 37 supports the ball bearings 22, 22' at the inner ends of said shafts. The ball bearings 21, 21', 22, 22' are of a type designed to sustain a moderate amount of axial thrust, and their disposition is such as to withstand thrusts from opposite directions, thus giving a definite longitudinal location to the shafts 20, 20'. The ball bearings 21, 21' are however subjected continuously and intentionally to the thrust of a spring 41 or 41' respectively, which acts through the sleeve 32 or 32' respectively, the cylinder barrel 23 or 23' respectively, and the plate 30 or 30' respectively to press these parts toward the mid-plate 37, while such springs react through the washer 42 or 42' respectively and the shaft 20 or 20' respectively to the bearing 21 or 21' respectively.

Continuing the description of those parts which are substantially the same for the motor as for the pump, it will be noted that each cylinder bore 29 of the motor (this description, except for the reference numerals applying equally to the pump) contains a piston 43, for receiving a fluid pressure on one side and transmitting the same as a single force through the piston rod or push rod 44 to the swash plate 45. In addition to its body or central tubular section 44, this push rod comprises two stop washers 46, 47, and end portions or heads 48, 49 screwed to the ends of the said tubular section and clamping the washers in place, so that the parts 44, 46, 47, 48, and 49 will be connected with each other rigidly. The head 49 has a spherical crown for contact with a hardened steel button 50, which is secured in the piston 43 by a calked copper ring 51, the purpose of this construction being freedom of rotation of the push rod with respect to the piston and avoidance of any eccentricity in the loading of the piston which would cause a cramping of the piston in the cylinder bore.

The push rod is guided in its reciprocatory movement by a ball bearing consisting of a brass cage 52 and two rows of balls 53 and 54. The cylindrical surface of the push rod forms the inner ball race of this bearing, while the cylinder wall 29 forms the outer ball race. A bearing of this character permits of two degrees of freedom of movement, since the push rod can be reciprocated and also rotated, both motions being frictionless.

The contact face of the head 48, where the push rod engages the swash plate, is made of spherical curvature, the center of the sphere being at a point 55 in the axis of the push rod. The radius of the sphere and the distance between the balls 53 and 54 are so related to each other and to the amplitude of movement or stroke of the push rod and of the ball bearing that the point 55 is always somewhere between the planes of the two rows of balls. The reason for this adjustment or relation will appear from a consideration of the forces involved. The push rod is subject to two forces nearly opposite, that of the swash plate 45 on one side and that of the piston 43 on the other. The lines of action of these two forces intersect at the point 55 which must therefore be the point of application of the resultant which is the load on the ball bearing. Since the resultant force is always between the two rows of balls, it follows that the load will be divided between them and the load on one row of balls can never be greater than the resultant load, as would be the case if the point 55 fell on the same side of both rows of balls.

The longitudinal movement of the push rod is twice that of the ball bearing. Hence, the movement of the push rod relatively to the ball bearing is equal to the movement of the latter in relation to the cylinder barrel 23. This relative movement of the push rod is kept within its proper limits by the stop washers 46 and 47, which in their extreme positions come in contact with the ends of the cage 52. Similarly, the movement of the cage 52 is kept within its proper limits by the stop ring 56, which fits into the bottom of a groove cut in the barrel 23 to a sufficient depth from the outside to intersect the cylinder bores 29.

The spherically-curved surface of the head 48, being merely for contact with the swash plate 45, comprises but a small part of the entire sphere. It is, in fact, a zone of the colatitude of which is the tilting angle of the swash plate. Since, as explained below, the swash plate 45 of the motor section maintains a fixed angle or inclination in the apparatus illustrated, it follows that the path of the point of contact on the head 48 will be along the arc of a small circle of the sphere, that is to say, the point of contact of the head 48 with the swash plate 45 will always be at the same distance from the longitudinal axis of the push rod, and for this reason the free end of the push rod may be made tubular or open at the motor section, as shown, which may be of advantage in that it reduces the weight and simplifies the hardening and grinding of this part.

At the pump end or section of the apparatus, however, the swash plate 45' may be adjusted to different inclinations as explained below, and take a position inclined either to the left or to the right (Fig. 1 showing a position of extreme inclination), so that the point of contact of the head 48' with the swash plate 45' may be anywhere upon or within the small circle which is its path when the tilting angle is a maximum. The used part of the spherical surface of the head 48' will therefore be a face of which said surface forms a part, and accordingly, the free end of the head 48' is closed instead of open.

Each of the swash plates has a flat surface for contact with the respective push rods, and where this flat surface intersects the axis of the shaft at the point 57 or 57', is the center of the swash plate, the axis about which this plate revolves being indicated at 57, 58 and 57', 58' respectively. The bearing for the rotation of the swash plate is subjected to a very considerable axial thrust due to the combined action of the push rods, but the radial load is quite small, being due principally to the mere weight of the parts. This thrust is taken on the conical rollers 59, 59' and transferred to the roller tracks 60, 60', while the radial load is taken on the oil film bearings at the outer and inner cylindrical surfaces of the brass sleeve 62 or 62' which, conveniently, is made an integral part of the cage of the conical roller thrust bearing, the several rollers being mounted to turn between radial members or spokes of said cage, and being held against excessive outward movement in any suitable manner, as by a retaining ring 19 or 19' respectively. The sleeve 62 or 62' is fitted on a tubular member 61 or 61' respectively, having a shoulder to engage the outer edge of such sleeve, while the inner edge of the sleeve engages the swash plate, on the outer face or back thereof. The inner face of the swash plate is engaged by a holding or clamping member 66 or 66' respectively having a screw connection with the tubular member 61 or 61' respectively, thus holding the swash plate in proper position to the corresponding roller track and roller bearing cage. The shafts 20, 20' extend through the tubular members 61, 61' without touching them. At the pump section of the machine, the holding member 66', which clears the shaft 20' in all positions of the swash plate, has a portion of its inner surface curved spherically, the center of said sphere being at the center 57' of the annular flat surface of the swash plate 45' which is engaged by the ends of the push rods; of course, this point 57' lies on the axis of the shaft 20', as stated hereinbefore. This spherically-curved inner surface of the holding member 66' engages a like spherical surface on the outside of a sleeve 65 having a cylindrical inner surface in longitudinally-sliding engagement with the shaft 20'. Thus, while the center of curvature of the spherical inner surface of the holding member 66' and of the spherical outer surface of the sleeve 65 are always at the same point 57', this point may shift lengthwise on the axis of the shaft 20'.

While the swash plate 45 of the motor section is held at a fixed angle, the inclination of the swash plate 45' at the pump section may be varied from zero (neutral position, inner surface of swash plate perpendicular to axis of shaft) to a maximum angle at each side of the neutral mid position. I prefer to employ an arrangement in which, as illustrated, the maximum angle which the pump swash plate 45' may form with a plane perpendicular to the shaft axis, will be smaller than the angle which the motor swash plate 45 forms with such a plane; for instance, the motor swash plate 45 may be set at an angle of 20°, while the maximum angle of the pump swash plate 45' may be 12½°. The swash plate 45 is secured rigidly, say to the closing plate 39.

For varying the inclination of the pump swash plate 45', I have shown the following mechanism: On its inner face, the closing plate 40 is provided with vertical guide ribs 40' on opposite sides of its center, and in sliding engagement with said ribs are corresponding ribs 63' on a vertically-movable slide 63 having an internally-threaded boss 63" in engagement with a threaded control shaft 64, suitably held at 36' against longitudinal movement, and extending to the outside of the casing shell 36, to be operated by hand or otherwise. The slide 63 has a central opening 63* of sufficient size to permit the desired vertical movement without bringing such slide into contact with the shaft 20'. At each side of the center the slide 63 has two inner lugs 63ᵃ located at the same level, and two outer lugs 63ᵇ likewise located at the same level, said outer lugs being provided, in their outer surfaces, with arcuate grooves curved according to a center or axis which is horizontal and intersects that of the shaft 20' when the slide 63 is adjusted to bring the swash plate 45' to the neutral or mid position shown in Figs. 4 and 5. In any position, said axis of the grooves lies in a plane perpendicular to the shaft 20'. Into said grooves project the circular flanges of connecting members 80, fitted on pivot bolts 81 the inner ends of which are screwed or otherwise fastened to the inner lugs 63ᵃ, while the outer portions of the pivots are seated in suitable recesses of the outer lugs 63ᵇ, as shown best in Fig. 4. The said flanges of the connecting members also extend into arcuate grooves provided in lugs 60" which are projected from the roller track 60' and lie adjacent to the lugs 63ᵇ, said lugs 60" being also provided with aligning horizontal recesses to seat the outer portions of the pivot bolts 81. Fig. 5 shows clearly that there is sufficient freedom for the lugs 60" to turn relatively to the lugs 63ᵇ, about the pivot axis 81, that is, the aggregate circumferential extent of a groove in a lug 63ᵇ and the groove in the companion lug 60", is less than 360°. The axis of the pivot bolts 81 corresponds to the point 58' of the axis 57', 58' mentioned hereinbefore. During the vertical adjustment of the slide 63, the point 58' has a purely vertical movement, and since the distance from said point to the center of curvature 57' is constant, it follows that the point 57' will have to move slightly lengthwise of the shaft axis during such adjustment, and this is permitted by mounting the sleeve 65 to slide on the shaft 20'. It will be obvious that the angle of the swash plate 45' will be adjusted by the movement of the slide 63. In its extreme positions, the swash plate may be stopped and supported more firmly, by the engagement of the roller track 60' with a suitably inclined surface 63ᵈ, either at the top as in Fig. 1, or at the bottom, if the swash plate is inclined in the opposite direction. In order to facilitate assembling of the parts, the holding member 66' is formed with a removable cap section 66".

In view of the fact that the maximum angle of the pump swash plate 45' is always less (in the construction shown) than the angle of the motor swash plate 45, it follows that the motor push rods will always have a longer stroke than those of the pump, and for this reason the pump cylinders 29', the pump push rods, and the ball cages 52' of the pump are made shorter than the corresponding parts of the motor.

The general principle of the operation of this machine is the same as in my earlier patents, that is to say, the midplate 37 has two ports 37' and 37" located on opposite sides of a plane passing through the axis of the shafts 20, 20' and through the axes 57, 58 and 57', 58', one of said ports serving as a suction port, and the other as a delivery port of the pump, according to the direction in which the pump swash plate 45' is inclined. The perforations 31, 31' come into registry successively with the ports 37', 37" of the midplate, so that the liquid can pass properly from the pump to the motor, and vice-versa, if the swash plate 45' is in an inclined position during rotation of the pump shaft 20'.

It is very important and practically essential that the several piston movements resulting from any change of the tilting angle of the pump swash plate 45' shall have an algebraic sum equal to zero. Otherwise, an attempt to forcibly change the aggregate volume of oil on the midplate side of the several pistons might result in the development of a great resistance to the turning of the control shaft 64. This requirement of constancy of oil volume for different tilting angles is successfully met by the particular location of the fulcrum 58' on which the swash plate 45' swings relatively to the adjusting slide 63, this fulcrum 58' being so chosen that the distance 57', 58' is equal to the product of the secant of the maximum tilting angle (12½° in the particular example assumed) and the radius of the spherical part of the head 48' of the push rod.

The character of the relative motion at the point of contact between the push rod and the swash plate (whether at the pump or at the motor) is a matter of considerable importance. This should be, if possible, a pure rolling motion. Some spinning may be permitted, but there must be no slipping or sliding. That a single push rod acting alone will function properly is quite evident, but the case of several rods acting simultaneously is not so simple. A mathematical analysis however, reveals the fact that a plurality of push rods will function together without the necessity of slipping or sliding and with very little spinning. In Fig. 8 I have shown a portion of the motor swash plate 45, looking perpendicularly to its flat contact surface, and on said surface I have indicated at 67 the curve which the point of contact with one of the push rod heads 48 will describe on said surface during operation of the liquid-motor. The point 67' of said curve indicates the position of the contact point when the parts are in the position Fig. 1. The swash plate 45 revolves faster than the cylinder barrel, the ratio of the speeds being equal to the secant of the tilting angle. In the case shown, this corresponds approximately to twenty revolutions of the swash plate to nineteen of the cylinder barrel. For each revolution of the cylinder barrel 23, there is a loop in the curve 67. After half a revolution of the cylinder barrel in the direction of the arrow, the point of contact will have moved to the point 67" on the path, and will then be at the lower portion of the machine, as indicated at 68 in Fig. 1; that is to say, the point 68 in Fig. 1 indicates the location of the point of contact between the head 48 and the swash plate 45 at the time the head 48, in tracing the curve 67 on the surface of the swash plate, reached the point 67" of the said curve. All the outermost points of this curve, corresponding in position to the point 67", represent positions traced when the point of contact is at the lowermost portion of the swash plate, that is to say at the point 68, vertically below the axis of the shaft 20, while all the innermost points of the curve 67 (such as 67' in Fig. 8) represent positions traced when the point of contact is in the uppermost position which it ever takes, that is to say, vertically above the axis of the shaft 20, as indicated at 67' in Fig. 1. The curve 67 is a parallel to an epicycloid 69 which is the path of the point where the axis 70 of the push rod prolonged intersects the surface of the swash plate. When the push rod is at the middle of its stroke, it has a pure rolling contact with the swash plate, the axis 70 at such times being at one of the cusps 69* of the epicycloid 69. The points 67' and 69' are traced simultaneously, and the same remark will apply to the points 67" and 69". At all times when the push rod is not at the middle of its stroke, it has a spinning motion which varies harmonically, attaining its maximum value when the push rod is at the end of its stroke (positions 67', 67"). The spinning motion is accompanied proportionally by a rotation of the push rod in the cylinder barrel the amplitude of which, about one-sixteenth of a revolution in the case shown, is significant of the small amount of the spinning motion at the contact point.

As a connector between the piston and the swash plate, the push rod can function as a strut but not as a tie. Its inability to act as a tie necessitates some other provision for maintaining the parts in contact. Especially is this the case at the pump end of the machine, because here the working or high pressure stroke of the piston is toward the midplate, and the return or outward stroke occurs during a low-pressure interval. To meet this situation, there is maintained at all times in the working fluid a minimum pressure sufficient to overcome the friction and inertia of the pistons, push rods, and ball bearings. This pressure is generated by the chamber gear replenishing pump 71 and is transmitted to the working fluid through the pipe 72 and the replenishing valves 73 to the ports 37', 37" in the midplate. The fact that the pressure can be transmitted to that port only which for the time being is the low-pressure port (that is to say, the port through which the liquid returns to the pump), necessitates a check valve, such as 73, in the connections of both ports, see Fig. 2. The volumetric capacity of the replenishing pump is somewhat in excess of the normal leakage of the working fluid, the excess passing off by way of the pipe 74 and the safety valve 75, the adjustable spring of which provides a means for realizing the sufficiency of the pressure.

With a positive pressure at all times in the working fluid, it is no longer necessary to immerse all the working parts in oil in order to prevent the pistons from sucking air (it being understood that oil is generally employed as the working fluid). Accordingly, the oil is drained from the casing shells 35 and 36 as fast as it accumulates, and this materially reduces the wasteful friction of the machine. Provision is however made for efficient lubrication of the parts as follows: From the motor end the oil drainage is through the pipe 76, the connection of which with the shell 35 is such as to maintain within the shell a level of oil, say at the line 77, appropriate for the splash lubrication of all parts at the motor end of the machine. At the pump end, the safety valve 75 by its construction and location is made to function as an oil spray lubricator for all working parts at this end of the machine. The drainage from both ends or sections of the machine flows by gravity into the reservoir 78 underneath the pump section, from which reservoir the replenishing pump 71 gets its supply.

In certain cases where the speed gear remains idle for long periods during which the working fluid might drain away from the cylinders and be replaced by air, it may be desirable to provide a storage reservoir (indicated diagrammatically at 79 as connected with the pipe 74), which may be in the nature of an accumulator or of an air chamber or of an open tank at an elevation. It will be understood that each of the two sections of the machine is fully operative by itself, and also that each of these sections is reversible in function, and might be used either as a pump to propel a fluid, or as a motor driven by a fluid under pressure. Thus, I might remove all the parts shown at the right of the mid-plate 37, or all the parts shown at the left of such mid-plate, and use the remaining section or apparatus as a pump, one of the mid-plate ports forming a suction port, and the other a delivery port; or the same section or apparatus might be used as a motor, by admitting a fluid under pressure through one of the mid-plate ports, and using the other mid-plate port as an exhaust port.

I claim as my invention:

1. In an apparatus for operation with a fluid in motion, a rotary barrel having cylinders extending lengthwise of its axis of rotation, pistons arranged to reciprocate in said cylinders, push rods in operative relation to said pistons within the cylinders but out of contact with the cylinder walls, balls interposed between said push rods and the respective cylinder walls, and a rotary plate inclined to the barrel axis and operatively related to said push rods.

2. In an apparatus for operation with a fluid in motion, a rotary barrel having cylinders extending lengthwise of its axis of rotation, pistons arranged to reciprocate in said cylinders, push rods in operative relation to said pistons within the cylinders but out of contact with the cylinder walls, a bearing member interposed between each push rod and the respective cylinder wall, and movable lengthwise in relation both to the barrel and to the push rod, and a rotary plate inclined to the barrel axis and operatively related to said push rods.

3. In an apparatus for operation with a fluid in motion, a rotary barrel having cylinders extending lengthwise of its axis of rotation, rectilinearly-reciprocating members arranged within said cylinders, and an inclined plate held to rotate with said barrel and in direct engagement with the ends with said members at points off the longitudinal axes of the respective reciprocating members.

4. In an apparatus for operation with a fluid in motion, a rotary barrel having cylinders extending lengthwise of its axis of rotation, reciprocatory members arranged within said cylinders and having ends with surfaces forming part of spheres the centers of which are on the longitudinal axes of the respective members and remain within said cylinders in every operative position of the reciprocatory members, and an inclined plate held to rotate with said barrel and engaging said spherically-curved end surfaces.

5. In an apparatus for operation with a fluid in motion, a rotary barrel having cylinders extending lengthwise of its axis of rotation, reciprocatory members arranged within said cylinders, a bearing member interposed between each of said members and the corresponding cylinder and movable lengthwise relatively both to the barrel and to the reciprocatory member, and a rotary inclined plate operatively related to said reciprocatory members.

6. In an apparatus for operation with a fluid in motion, a rotary barrel having cylinders extending lengthwise of its axis of rotation, reciprocatory members arranged within said cylinders and having end surfaces forming part of spheres the centers of which are on the longitudinal axes of the respective members, a bearing interposed between each of said reciprocatory members and the wall of the corresponding cylinder, and movable lengthwise in relation both to the barrel and to the reciprocatory member, and a rotary plate inclined to the barrel axis and operatively related to said reciprocatory members to engage the spherically-curved end surfaces of said members, said sphere centers always remaining between the ends of the effective portions of the respective bearings.

7. In an apparatus for operation with a fluid in motion, a rotary barrel having cylinders extending lengthwise of its axis of rotation, reciprocatory members arranged within said cylinders and having end surfaces forming part of spheres the centers of which are on the longitudinal axes of the respective members, a cage interposed between each of said reciprocatory members and the wall of the corresponding cylinder, said cage having rows of balls at its ends, in engagement with the reciprocatory member and with the cylinder wall, and being movable lengthwise relatively both to the barrel and to said member, and a rotary plate inclined to the barrel axis and engaging the spherically-curved end surfaces of said members, said sphere centers always remaining between the planes of the two rows of bearing balls.

8. In an apparatus for operation with a fluid in motion, a rotary barrel having cylinders extending lengthwise of its axis of rotation, reciprocatory members arranged within said cylinders, a cage interposed between each of said reciprocatory members and the wall of the corresponding cylinder, said cage having rolling elements engaging simultaneously the cylinder wall and the reciprocatory member, and being movable lengthwise relatively both to the barrel and to the said member, and a rotary plate inclined to the barrel axis and operatively related to said reciprocatory members.

9. In an apparatus for operation with a fluid in motion, a rotary barrel having cylinders extending lengthwise of its axis of rotation, reciprocatory members arranged in said cylinders, a bearing member interposed between each of said members and the corresponding cylinder and movable lengthwise relatively both to the barrel and to the reciprocatory member, means for limiting the movement of such bearing member relatively to the cylinder barrel, and a rotary plate inclined to the barrel axis and operatively related to said reciprocatory members.

10. In an apparatus for operation with a fluid in motion, a rotary barrel having cylinders extending lengthwise of its axis of rotation, reciprocatory members arranged in said cylinders, a bearing member interposed between each of said members and the corresponding cylinder wall and movable lengthwise relatively both to the barrel and to the reciprocatory member, means for limiting the movement of such bearing member relatively to the corresponding reciprocatory member, and a rotary plate inclined to the barrel axis and operatively related to said reciprocatory members.

11. In an apparatus for operation with a fluid in motion, a rotary barrel having cylinders extending lengthwise of its axis of rotation, reciprocatory members arranged in said cylinders, a bearing interposed between each of said members and the wall of the corresponding cylinder, and movable lengthwise relatively both to the barrel and to such member, separate means for limiting the movement of each bearing relatively to the corresponding reciprocatory member and to the barrel respectively, and a rotary plate inclined to the barrel axis and operatively related to said members.

12. In an apparatus for operation with a fluid in motion, a rotary barrel having cylinders extending lengthwise of its axis of rotation, a stationary ported member adapted for cooperation with said barrel but spaced therefrom, a plate connected with the barrel loosely but held to rotate therewith said rotary plate being interposed between said stationary member and the barrel, and having perforations of smaller diameter than the cylinders, in permanent registry with said cylinders and in successive registry with the ports of said stationary member; reciprocatory members in said cylinders, and rotary means operatively related to said members and inclined to the barrel axis.

13. In an apparatus for operation with a fluid in motion, a rotary barrel having cylinders extending lengthwise of its axis of rotation, a stationary ported member adapted for cooperation with said barrel but spaced therefrom, a plate connected with said barrel and interposed between said stationary member and the barrel, said plate having perforations in registry with the cylinders of the barrel and adapted for registry with the ports of said stationary member, a shaft held to turn with said barrel, and a spring arranged to press the barrel and plate toward said stationary member, and the shaft in the opposite direction.

14. In an apparatus for operation with a fluid in motion, a rotary barrel having cylinders extending lengthwise of its axis of rotation, a stationary ported member adapted to cooperate with the said barrel but spaced therefrom, a plate connected with said barrel and interposed between said stationary member and the barrel, and having perforations in registry with said cylinders and adapted for registry with the ports of said stationary member, and a spring arranged to press the barrel and plate toward said stationary member.

15. In an apparatus for operation with a fluid in motion, a rotary barrel having cylinders extending lengthwise of the axis of rotation, reciprocatory members arranged in said cylinders and having heads with surfaces rounded according to spheres the centers of which are on the longitudinal axes of said members, and a plate arranged to rotate in contact with said spherically-rounded surfaces, about an axis which is inclinable to form different angles with that of the barrel, by swinging said plate on a fulcrum transverse to said axes, the distance of said fulcrum from the point of intersection of the contact plane of said plate with said reciprocatory members, being equal to the product of the secant of the maximum angle to which said plate may be inclined and the radius of the spheres according to which the contact ends of the reciprocatory members are curved.

16. In an apparatus for operation with a fluid in motion, a rotary barrel having cylinders extending lengthwise of its axis of rotation, reciprocatory members arranged in said cylinders and having heads with spherically-rounded surfaces, a plate arranged to rotate in contact with said spherically-rounded surfaces, about an axis which is inclinable to form different angles with that of the barrel, and a movable member on which said plate is fulcrumed about an axis transverse to the first-named axes, the distance of said fulcrum axis from the point of intersection of the contact surface of said plate with said reciprocatory members, being equal to the product of the secant of the maximum angle to which said plate may be inclined and the radius of said spherically-curved contact ends of the reciprocatory members.

17. In an apparatus for operation with a fluid in motion, a rotary barrel having cylinders extending lengthwise of its axis of rotation, reciprocatory members in said cylinders, a shaft co-axial with the barrel and rotating therewith, a sleeve mounted to slide lengthwise on said shaft and having its outer surface curved according to a portion of a sphere the center of which is on the axis of the shaft, a rotary plate in operative relation to said reciprocatory members and having a spherically-curved socket mounted on said sleeve, and a slide movable transversely to the barrel axis, said rotary plate being fulcrumed on said slide to swing about an axis transverse both to the path of the slide and to the axis of the barrel.

18. In apparatus for operation with a fluid in motion, a rotary barrel having cylinders extending lengthwise of its axis of rotation, reciprocatory members in said cylinders, a member supported to move lengthwise of the barrel axis and having its outer surface curved according to a portion of a sphere the center of which is on the barrel axis, a rotary plate in operative relation to said reciprocatory members and having a spherically-curved socket mounted on said member, and a control member movable transversely to the barrel axis, said rotary plate being fulcrumed on said control member to swing about an axis transverse both to the path of said control member and to the axis of the barrel.

In testimony whereof, I have signed this specification.

HARVEY D. WILLIAMS.